United States Patent [19]

Carle et al.

[11] Patent Number: 5,611,766
[45] Date of Patent: Mar. 18, 1997

[54] TRANSPORTABLE, MODULAR VITRIFICATION SYSTEM FOR THE TREATMENT OF WASTE MATERIAL

[75] Inventors: Richard C. Carle, Waterville; Karl M. Slevert, Oregon; Douglas H. Davis, Perrysburg; John E. Polcyn, Toledo, all of Ohio; David M. Bennert, Newry, S.C.; Irving M. Williams, Bowling Green, Ohio

[73] Assignee: Envitco, Inc., Toledo, Ohio

[21] Appl. No.: 597,114

[22] Filed: Feb. 6, 1996

[51] Int. Cl.$^6$ ............................ A62D 3/00; B09B 3/00; G21F 9/00
[52] U.S. Cl. .......................... 588/252; 65/134.8; 588/11; 588/256; 588/259; 588/900
[58] Field of Search ................................. 65/134.8, 335, 65/346, 347; 588/11, 12, 201, 249, 252, 253, 259, 261, 900, 256

[56] References Cited

U.S. PATENT DOCUMENTS

| | | |
|---|---|---|
| 3,321,409 | 5/1967 | Grover et al. . |
| 4,145,396 | 3/1979 | Grantham ............................ 588/201 |
| 4,171,596 | 10/1979 | Varlonga . |
| 4,224,177 | 9/1980 | Macedo et al. . |
| 4,234,449 | 11/1980 | Wolson et al. . |
| 4,312,655 | 1/1982 | Pack ................................ 65/134.8 X |
| 4,320,028 | 3/1982 | Leuchtag . |
| 4,376,070 | 3/1983 | Pope et al. . |
| 4,462,318 | 7/1984 | Carbeau ............................ 588/900 X |
| 4,619,531 | 10/1986 | Dunstan . |
| 4,666,490 | 5/1987 | Drake ................................ 65/134.8 X |
| 4,670,227 | 6/1987 | Smith ................................ 588/900 X |
| 4,744,182 | 5/1988 | Shacket et al. . |
| 4,764,272 | 8/1988 | Fox, Sr. . |
| 4,855,082 | 8/1989 | Duivelaar ............................ 588/11 |
| 4,864,942 | 9/1989 | Fochtman et al. . |
| 4,897,222 | 1/1990 | Muntzel et al. . |
| 4,944,785 | 7/1990 | Sorg et al. . |
| 4,977,839 | 12/1990 | Fochtman et al. . |
| 5,022,329 | 6/1991 | Rackley et al. . |
| 5,052,312 | 10/1991 | Rackley et al. . |
| 5,111,626 | 5/1992 | Fortune . |
| 5,199,354 | 4/1993 | Wood . |
| 5,273,567 | 12/1993 | Richards ............................ 65/134.8 |
| 5,277,846 | 1/1994 | Tanari . |
| 5,288,435 | 2/1994 | Sachse et al. . |
| 5,309,850 | 5/1994 | Downs et al. . |
| 5,353,558 | 10/1994 | Shea, Sr. et al. . |
| 5,365,013 | 11/1994 | Aulson ................................ 588/249 |
| 5,424,042 | 6/1995 | Mason et al. ........................ 588/252 X |
| 5,536,114 | 7/1996 | Wetmore et al. .................. 65/134.8 X |

FOREIGN PATENT DOCUMENTS 2150131  6/1985  United Kingdom .................. 65/134.8

OTHER PUBLICATIONS

Modular Enviroglass Vitrification Technology for Low Level Radioactive and Mixed Wastes, J. Bradley Mason, Vectra Technologies, Inc. (undated).

Primary Examiner—George A. Suchfield
Attorney, Agent, or Firm—MacMillan, Sobanski & Todd

[57] ABSTRACT

A system for the treatment of waste material includes a waste-receiving module for receiving waste material and blending it with glassmaking additives. The waste-receiving module is enclosed within a waste-receiving module container which is capable of being sealed for over the road transport so that the waste-receiving module can be transported safely from one source of waste material to another without complete decontamination. The system also includes a melter module containing a melter for melting together the blended waste material and glassmaking additives to form homogeneous molten glass and thereby stabilize the waste material. The molten glass is discharged to form a vitrified waste material. The melter module is comprised of one or more melter module containers which are capable of being sealed for over the road transport so that the melter module can be transported safely from one source of waste material to another without complete decontamination. Also provided is an emission control module for receiving waste gases from the melter module and for cleaning them for discharge to the atmosphere. The entire waste treatment system can be readily disassembled, transported over the road from one source of waste material to another, and reassembled.

24 Claims, 3 Drawing Sheets

TRANSPORTABLE, MODULAR VITRIFICATION SYSTEM FOR THE TREATMENT OF WASTE MATERIAL

BACKGROUND OF THE INVENTION

This invention pertains to a system for the treatment of waste material, particularly by vitrification of the waste material. More specifically, this invention pertains to waste treatment system which enables waste treatment equipment to be readily transported to a waste site for temporary installation for the purpose of stabilizing the waste material, which may include hazardous material, low level radioactive material, or both.

Stabilization and treatment of waste material is a significant waste management problem. Although this waste management problem includes many different types of wastes, a class of wastes of particular concern is the class of mixed wastes, which contains both hazardous and low level radioactive materials. Because mixed wastes contain both hazardous and radioactive materials, they are covered by two sets of regulations, which are not inclusive of one another. The radioactive component is covered by regulations developed by the Nuclear Regulatory Commission, which establishes the requirements for low level waste landfills. The hazardous component is covered by regulations developed by the Environmental Protection Agency, which sets the requirements for hazardous waste disposal. Increased environmental consciousness has resulted in the need to stabilize many wastes, including mixed wastes, in a controlled and safe manner to avoid deleterious effects to the air and soil, and to the ground and surface water. Successful methods of stabilizing mixed wastes offer the potential for removing these wastes from hazardous regulatory control, so that only radioactive management requirements are necessary. Examples of the types of waste materials potentially harmful to the environment include low level nuclear wastes such as radioactive medical wastes, rediotracer materials, and cleanup materials from radioactive operations. Other examples include organic materials such as solvents, PCB's and dioxins which are known to be medically hazardous to human health, various heavy metals such as chromium, lead and the like, contaminated soils, waste water treatment sludge, incinerator ash, and similar materials. Mixed wastes consist of any combination of radioactive materials and hazardous materials, as described above, that are regulated as hazardous wastes.

A known system for stabilizing high level radioactive waste is the Defense Waste Processing Facility at Savannah River Site. This system treats the residues from spent fuel reprocessing operations, blends the high level radioactive waste material with glassmaking additives, melts the blend of high level radioactive waste material and the glassmaking additives to form a molten glass, thereby stabilizing the waste material, and discharges the molten glass to form a vitrified waste material. The vitrified waste material is a concentrated, inert, nonleachable material which can generally be safely stored without fear of offgassing, leaking or leaching hazardous or radioactive materials. The organic materials in such a high level radioactive waste are gassified in the vitrification process, and the gaseous streams are usually oxidized, passed through a particulate filter, and eventually released as a clean gaseous discharge. Such systems usually include large melters and extensive additional treatment facilities for preparation of the waste and feed material, and the treatment of gases and particulate matter emanating from the process. An estimated construction cost for such a system is $5 Billion U.S. dollars. A major component of these large systems is an extensive system for preventing discharge of the radioactive or hazardous waste material into the air, water or soil, exposure of personnel to the radioactive materials being treated, and additional safeguards for human-personnel.

While permanent, large scale vitrification systems are appropriate for large sources of nuclear waste, hazardous materials, or mixed waste, they are not suitable for sites with multiple waste streams or low volumes of waste material. Further, they are not appropriate for unproven waste streams or demonstration waste streams at sites where the ability to successfully stabilize waste material by vitrification has not yet been proven. These low volume and demonstration waste material sites may contain hazardous materials, low level radioactive materials, or mixed waste materials, which are a mixture of both hazardous materials and low level radioactive materials. Although most of these low volume and demonstration waste sites contain a relatively small amount of waste material to be treated, there are many more of these sites than there are of the high volume or high level radioactive waste sites.

In order to stabilize the waste material in the low volume and demonstration waste sites, and reduce the volume of waste designated for storage or disposal, a system for the treatment of the waste material must be economical, i.e., the return on the capital costs must be adequate. This precludes dedication of a fixed base waste treatment facility for most of the low volume and demonstration sites. It would be advantageous if there could be developed a system for the treatment of waste material, where the system could be transported from one waste material site to another with a minimum of erection, disassembly, transportation and reassembly costs. Such a system should be suitable for the treatment of hazardous, low level radioactive and mixed waste material without requiring extensive decontamination of the equipment prior to moving to the next low level, hazardous or mixed site. Further, such a system could be advantageously used at the demonstration sites to prove the suitability of vitrification as a method for stabilizing waste material.

SUMMARY OF THE INVENTION

There has now been developed a modular, transportable system for the treatment of waste materials without requiring extensive decontamination of the equipment prior to moving from one waste material site to another. The waste treatment system of the invention is suitable for the treatment of mixed waste, hazardous waste, or low level radioactive waste.

The modular, transportable system of the invention is advantageous over permanent or fixed base systems since the equipment can be installed in a matter of weeks rather than the 2 to 4 year time required for installation of a permanent system. Also, a transportable system enables the operation of a large scale demonstration at a waste site without constructing a permanent facility, thereby enabling the vitrification process to be tested for various sources of waste materials at several different sites over the lifetime of the equipment.

The cost of waste treatment is greatly reduced because preparation of the site is minimized compared to site preparation for a permanent system. Also, the compact size, and internalization of equipment within the containers enables operation with the least possible operating personnel. The modular feature of the treatment system of the invention enables the containers to be sealed and transported over the road to another site after disassembly. This enables the transport of the modules with a reduced danger of accidental contamination of the environment.

One of the major advantages of the invention is that the containers themselves act as the environmental enclosure, and an additional building or other structure is not required for operation. The containers can provide shielding and a controlled environment with slightly negative pressure to prevent accidental emission of potentially harmful material. Another key advantage of the invention is that the transportability and modularity allows the system to be operated under a temporary environmental site permit while demonstrating the vitrification process on the waste material, without requiring the permits and/or licenses for a permanent waste treating facility. This factor alone is extremely valuable in handling and stabilizing waste material at waste treatment sites.

According to this invention, there is provided a system for the treatment of waste material which includes a waste-receiving module for receiving waste material and blending it with glassmaking additives, where the waste-receiving module is enclosed within a waste-receiving module container, and where the waste-receiving module container is capable of being sealed for over the road transport so that the waste-receiving module can be transported from one source of waste material to another. The system also includes a melter module containing a melter for melting the blended waste material and glassmaking additives to form molten glass, thereby stabilizing the waste material, and for discharging the molten glass to form a vitrified waste material, where the melter module is comprised of one or more melter module containers, and where the melter module containers are capable of being sealed for over the road transport so that the melter module can be transported from one source of waste material to another. Also included is an emission control module for receiving waste gases from the melter module and for cleaning the waste gases for discharge to the atmosphere, where the emission control module is capable of being sealed for over the road transport so that it can be transported from one source of waste material to another.

The waste-receiving module and melter modules can be provided with a ventilation system capable of maintaining the pressure below atmospheric pressure. Also, the emission control module preferably comprises a quencher for cooling the waste gases, a cooler for further cooling the waste gases, a scrubber for removing fine particulate matter and soluble gases, a separator for removing scrub solution droplets, a blower to induce flow through the emission control module and to provide a negative pressure to the melter, and a filter for filtering particulate matter from the waste gases.

In a specific embodiment of the invention, the waste-receiving module includes a blend tank for blending waste material with glassmaking additives, and the atmosphere in the blend tank is drawn off and supplied to the emission control module.

DETAILED DESCRIPTION OF THE PREFERRED EMBODIMENT

Figure 1:
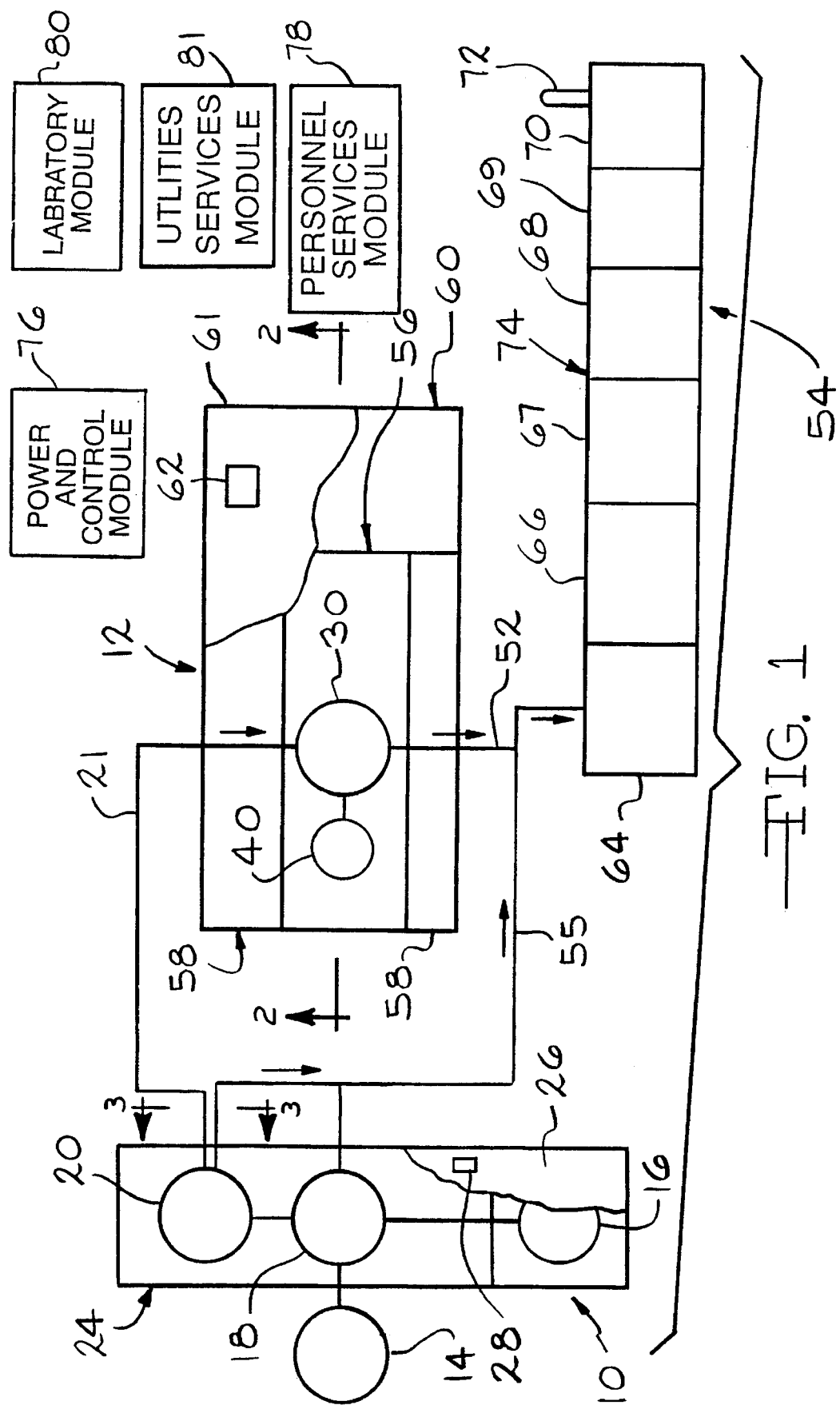
FIG. 1 is a schematic cutaway plan view of the waste treatment system of the invention.

As shown in FIG. 1, the waste treatment system of the invention generally includes the waste-receiving module 10 and the melter module 12. The purpose of the waste-receiving module is to take in the waste material to be treated and mix it with glassmaking additives in preparation for melting. The purpose of the melter module is to receive the blended waste material and glassmaking additives and melt them to form a molten glass, thereby stabilizing the waste material, and discharge the molten glass into a collection vessel or secondary process as a preparation for final disposal or disposition.

The waste-receiving module is provided with waste material from a source, such as waste tank 14. The waste material can be either in a liquid or slurry form, or in a solid form, which could be either a powder, granules or some other solid form. Glassforming additives are supplied from a glassmaking additive bin 16. If the glassforming additives are not already premixed, then several additive bins, not shown, would be used within the waste-receiving module to provide the glassmaking additives to be blended with the waste material. The glassmaking additive materials are well known in the glassmaking art, and usually include such materials as silica, alumina and magnesia.

The blend tank 18 is where the glassmaking additives are mixed with the waste material. The blend tank can be any suitable container for mixing the additives with the waste material. If the waste material is a dry or solid material, the blending process can be carried out as a dry process. Preferably, the blending process is accomplished as a liquid mixing process, with the addition of is water as needed, and with a suitable stirring mechanism, not shown.

Figure 3:
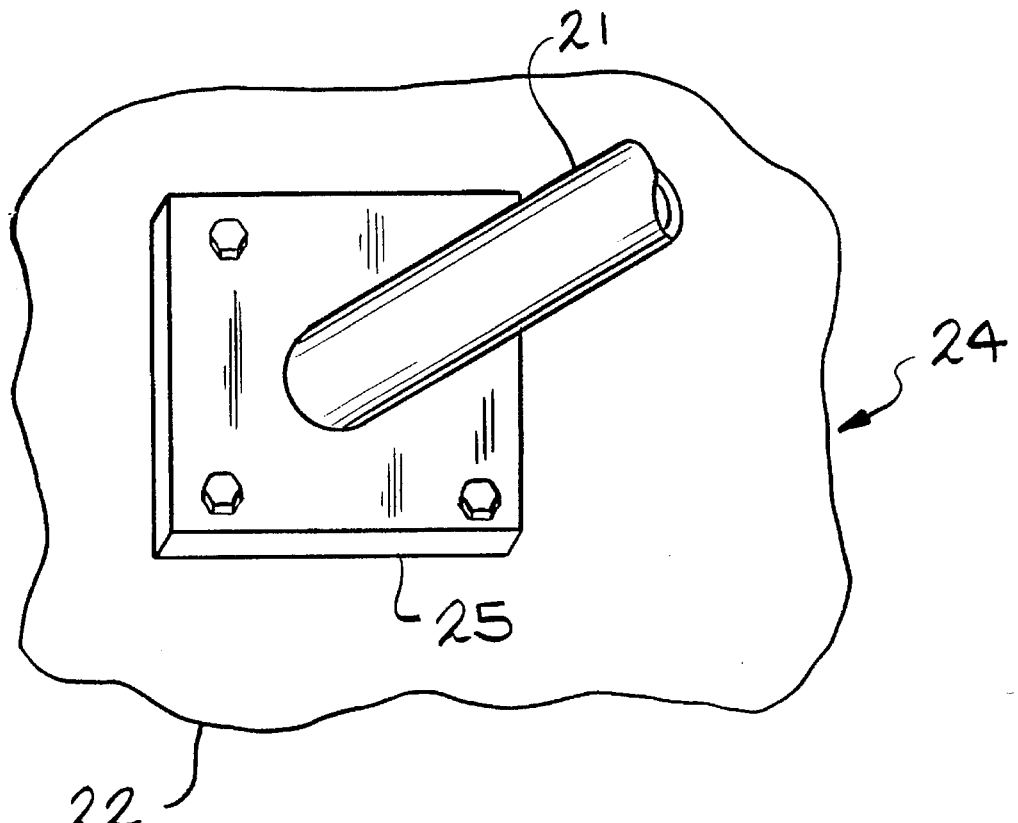
FIG. 3 is a perspective view of a cutaway portion of the waste-receiving module container, showing the flange connection of the waste supply line to the waste-receiving module.

The blended waste material and glassmaking additives are then accumulated in a suitable storage or surge tank 20, and eventually pumped away from the waste-receiving module via waste supply line 2 1 to the melter module 12. Preferably, the surge tank is equipped with equipment to constantly stir or agitate the waste material. Also, preferably, the waste supply line 21 is a recirculating system to prevent buildup of waste material in the piping apparatus. Suitable pumping equipment, not shown, must be used to deliver the blended material through the waste supply line to the melter module. As shown in FIG. 3, where piping, such as the waste supply line 21, passes through the walls 22 of the waste-receiving module container 24, a system, such as flange 25, is used for joining the waste supply line to the appropriate piping within the waste-receiving module.

Substantially the entire waste-receiving module 10 is contained within an enclosure, such as waste-receiving module container 24. The waste-receiving module container houses the equipment such as the glassmaking additive bin 16, the blend tank 18 and the surge tank 20. The waste-receiving module container restricts access to the potentially dangerous material in the waste-receiving module, and may even contain shielding against the transmission of radioactivity through the container walls. Other shielding may also be necessary. The container can be provided with doors and one or more air locks, not shown, to enable the safe entry and exit of personnel. Further, the container can be provided with a self-contained drainage system with a drainage collecting sump, not shown. Placing all of the waste-receiving module equipment within the waste-receiving module container 24 enables the entire waste-receiving module 10 to be sealed for over the road transport via trucks or other suitable conveyances. Although the waste-receiving module is shown as being housed within one container, it is to be understood that more than one container can be used.

The term "sealed for over the road transport" means that the container has been rendered to a condition suitable for transport over the public highways, including conforming substantially with relevant Department of Transportation and Department of Energy regulations, such as height, width and weight limitations, and relevant limitations regarding the transport of hazardous or nuclear materials. Prior to sealing the container, the pipes and tanks may be drained and flushed, and some or all of the interior surfaces may be hosed down. As a practical matter, sealing for over the road transport will include disconnecting pipes, ducts and the like at the locations where they enter the container. The openings where the pipes and ducts meet or pass through the container walls must be sealed, preferably by fastening flanges or other suitable blocking mechanisms. Other openings in the container with closures already attached, such as doors, are closed and preferably secured by locking. If the waste materials contained within the module are of sufficient radioactivity, then the container walls should be shielded to prevent undesirable radiation exposure for humans who might come near the container during transport.

The waste-receiving module container 24 is shown in a cutaway view, with only a portion of the container roof 26 showing. A ventilation system, such as ventilation unit 28 shown on the roof 26, can be provided to continually exhaust ambient air from the container 24. The ventilation unit will be provided with an appropriate filter to remove harmful particulate materials. The ventilation system enables the waste-receiving module to be operated at a pressure slightly below atmospheric pressure to prevent accidental exhausting of harmful materials from the container without being passed through an appropriate filter.

Figure 2:
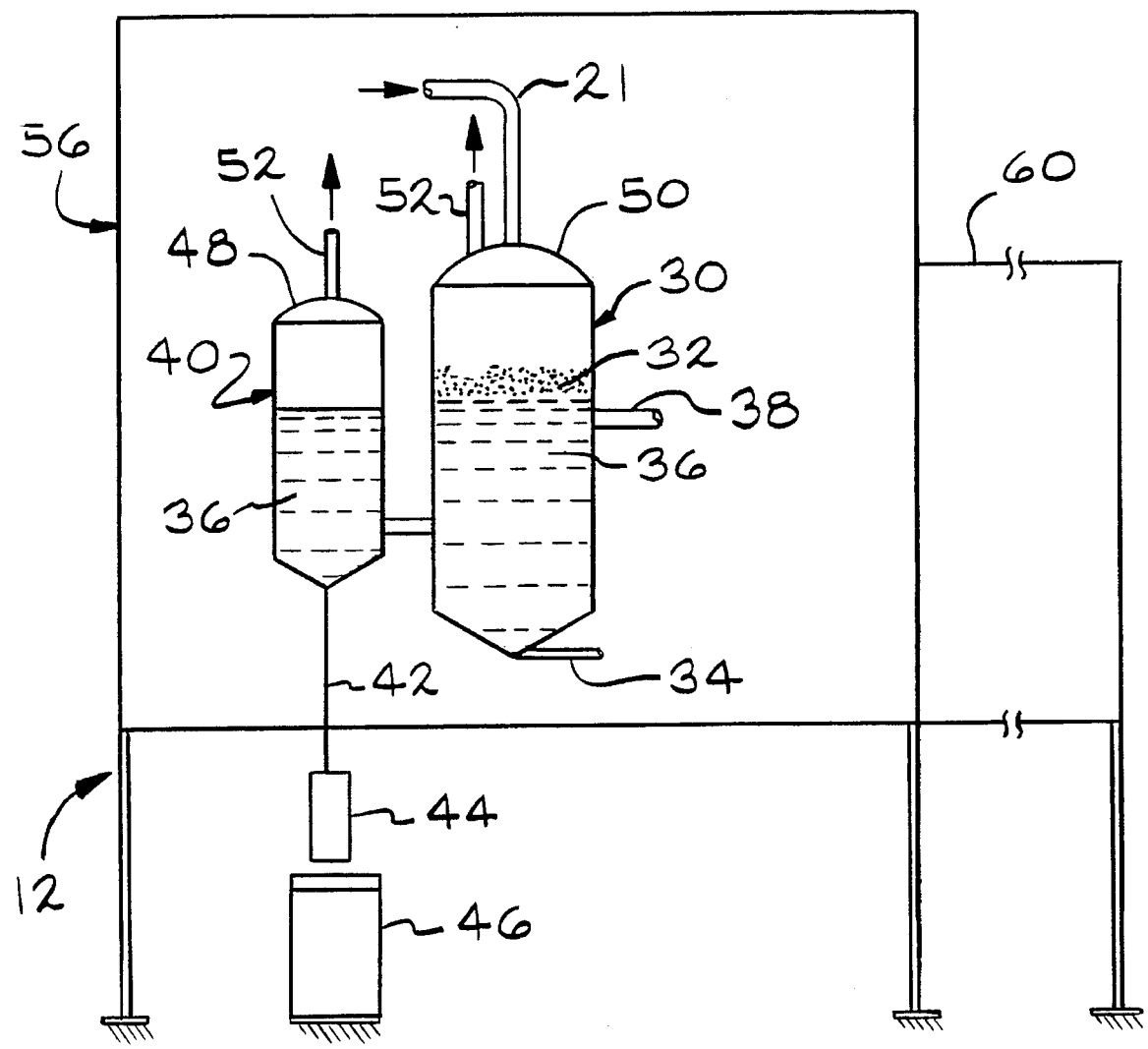
FIG. 2 is a view in elevation of the melter module of the waste treatment system of the invention, taken along lines 2—2 of FIG. 1.

As shown in FIGS. 1 and 2, the melter module 12 contains the melter 30 for melting the blended waste material and the glassmaking additives. The melter receives the blended material from the supply line and converts the material to molten glass. The melting of the waste material and glassmaking additives stabilizes the waste material. The melter can be any suitable melter for melting the glassmaking additives and the waste material. An electric, joule-heated melter is preferred over a gas fired melter because of the lower gaseous emissions produced by the electric melter. An appropriate melter is designed with multiple zones of power under individual control, powered by 480 volt, three phase power with a combination of submerged joule-heating electrodes, resistance-heating electrodes, resistance-heating elements or gas fired burners, available from several manufacturers, such as EnVitCo, Inc., Toledo, Ohio, or Toledo Engineering Co., Inc., Toledo, Ohio. The joule-heated system enables an unmelted layer or cold top 32 to remain on top of the molten glass. The cold top layer 32 lessens the volatilization of metals and other compounds within the melter. As the waste material enters the melter, the organic components of the waste stream will oxidize or be otherwise transformed into gaseous components by the heat of the melter.

After the waste material and glassmaking components are reduced to a molten state, an optional procedure can be performed as necessary to drain off the liquid metals, via a metal drain 34 which is positioned at the bottom of the melter. Also, an optional procedure can be performed as necessary to remove a layer of salts which may form above the molten glass body 36. The salts can be drained off via the salt drain 38. The molten glass itself flows into glass drain chamber 40 from which the molten glass is discharged as a molten glass stream 42. The molten glass stream is collected in containers, such as drums 44, which can be moved into place along a conveyor 46. Once the glass is cooled, it is a stabilized form of the waste material in a vitrified condition. The containers can be stored at an appropriate storage site.

As shown in FIG. 2, the glass drain chamber 40 and the melter 30 are both closed containers, having covers 48 and 50, respectively. This enables the volatile or gaseous products of the melting and/or burning of the blended waste material and glassmaking additives to be evacuated via the offgas lines 52 and routed to the emission control module 54, as shown in FIG. 1. It is to be understood that the blend tank 18 and the surge tank 20 can also be vented to the emission control nodule 54 by offgas line 55 in a similar manner.

The melter module 12 is designed so that it can be sealed and mounted for over the road transport so that it can be transported from one source of waste material to another. If the melter itself is sufficiently small, the melter module could possibly be contained within a single container. However, as a practical matter, the melter module must be broken down into several containers for over the road transport. One of the containers, the melter container 56, houses the melter 30 during over the road transport. Other containers, such as access containers 58, may be bolted together during over the road transport. During the melting operation the access containers expand the operating room surrounding the melter and the melter container, and provide additional space within the melter module. The staging container 60 is optionally provided at one end of the melter module to house various controls and equipment, and to provide a stepoff area for donning protective clothing to enter potentially hazardous or radioactive areas. The staging container contains supplies of nitrogen and water needed in the operation of the melter. In some cases, additional panels, not shown, may be necessary to close some of the containers during transport from one site to another. It can be seen that the melter module can be broken down into several containers, each of which can be sealed for over the road transport.

As shown in FIG. 1, the melter module roof 61 can be provided with a filtered ventilation unit 62 to exert a slightly negative pressure within the melter module, thereby preventing accidental leakage of unfiltered, potentially dangerous gaseous material from the melter module.

The emission control module 54 is designed to clean up the waste gases received from the melter module for discharge to the atmosphere. The emission control module can be any suitable collection of equipment for that purpose, provided that it is capable of being sealed for over the road transport so that it can be transported from one source of waste material to another. The waste gases may include particulate matter, volatile metals, volatile organic material, volatile acid gases, and other products of decomposition, combustion or pyrolysis.

As shown schematically in FIG. 1, a desirable first step in treating the gases is to quench them with a quencher 64. This step removes some of the coarse particles from the waste gas stream. The gases can be further cooled with a cooler, such as a packed bed cooler 66 which also removes some of the particulate matter and soluble acid gases from the gas stream. The gases can be further processed by passing them through a scrubber, such as venturi scrubber 67 for removing fine particulate matter and soluble acid gases. Preferably a wedge-shaped airfoil, not shown, is positioned in the throat of the venturi 67 to provide the appropriate pressure drop and maintain and control the pressure in the melter 30. A separator 68 removes scrub solution droplets from the waste gases.

Other equipment for handling the waste gases includes mist eliminators and reheaters, not shown. A blower 69 can be provided to induce flow through the stages of the emission control module, and to provide a negative pressure in the melter module. Finally, the gases are passed through a filter, such as HEPA filter 70. Preferably, the bulk of the emission control system is maintained at a slightly negative gauge pressure to prevent accidental leakage of potentially hazardous material into the environment. The cleaned offgas is emitted via emission stack 72.

Although the emission control module 54 is shown schematically as being contained within an emission control module container 74, a container is not required. The various components can be simply mounted on a concrete pad or similar support system. If the emission control equipment is in a container, sealing for over the road transport will be facilitated. Also, if the emission control equipment is in a container, a filtered ventilation unit, not shown, but similar to units 28 and 62, can be provided to exhaust filtered air from the container. If there is no container 74, then the individual components of the emission control module 54 must each be sealed for over the road transport.

In the preferred embodiment of the invention, the transportable, modular vitrification system includes an additional module 76 for handling some of the control and power functions for the operation of the overall system. Preferably, the power and control module 76 will enable remote control of the overall waste treatment system. The power and control module preferably contains electrical power distribution equipment. Various controllers, such as computers, can be used to track data for the waste treatment system. The modularity of the waste treatment system of the invention lends itself to quick assembly and reassembly. It is preferred to design the electrical power connections and other connections so that all the electrical and other connections can be made rapidly. The overall waste treatment system can also optionally include a personnel services module 78 suitable for the needs of the operating personnel.

In a preferred embodiment of the invention, the waste treatment system of the invention may also include an additional module containing laboratory apparatus for analyzing the composition of the raw waste material, the glassmaking additives, the vitrified material coming from the melter, and the radioactivity of samples of various materials taken from different parts of the waste treatment system. The laboratory module 80 provides for rapid analysis of the vitrified waste stream, blended waste and glass-forming additives, glass durability and composition, quality control checks, and detection of process variation.

One additional module which is preferably used in the transportable, modular vitrification system of the invention is a utilities services module 81 which contains equipment such as tanks for cooling water and contaminated water, cooling water pumps, and connections for nitrogen, makeup water, propane, and cooling water. The utilities services module can be an enclosed system, or an unenclosed system, mounted on a skid or other movable device, not shown. The stored contaminate water is used to provide additional makeup water when manufacturing the slurry feed, as well as to flush the feed system after operations. It will be appreciated by those skilled in the art that various other items of equipment can be housed in the utilities services module.

Figure 4:
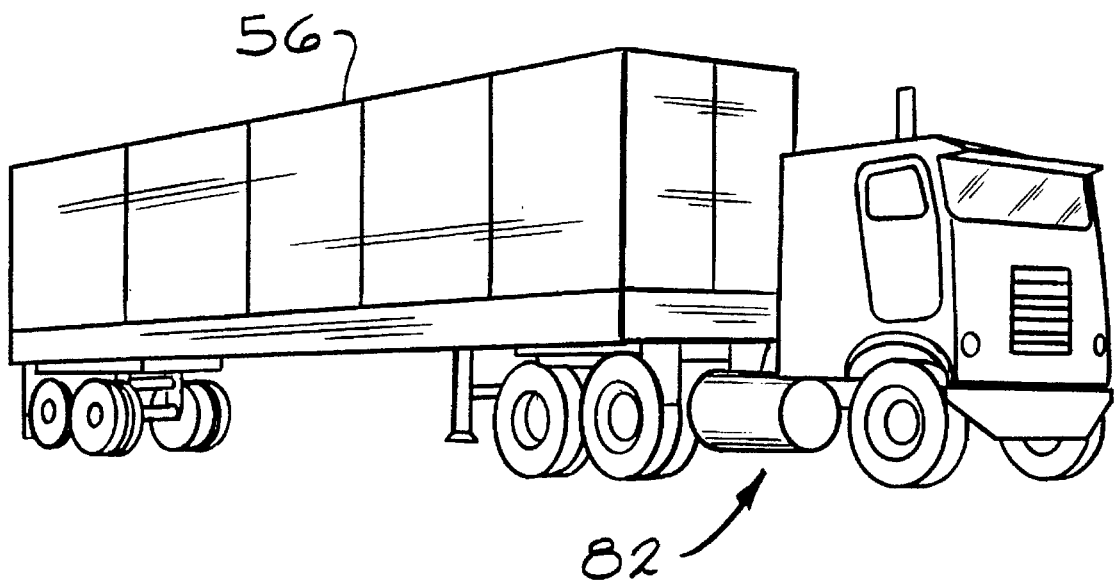
FIG. 4 is a perspective view of the melter container on a truck for over the road transport.

A cooling tower, not shown, is preferably included in the transportable, modular vitrification system of the invention. The power and control module, the personnel services module, the utility services module and the laboratory module should each be capable of being sealed for over the road transport. As shown in FIG. 4, the containers, such as melter container 56 of the melter module 12, can be mounted on a truckbed of a truck 82 for over the road transport from one waste site to another.

One of the potential advantages of the invention is that a dual ventilation system can be maintained to provide the appropriate level of environmental care for two different levels of potentially troublesome materials. The waste-receiving module 10 and the melter module 12 can both be provided with ventilation systems capable of maintaining the pressure within the respective modules at a level below atmospheric pressure. These individual ventilation systems must be capable of discharging environmentally acceptable, filtered air to the atmosphere. At the same time, the waste gases from the blend tank 18, the surge tank 20, and the melter 30, which require a higher level of cleanup, are fed into the emission control module 54 to clean the waste gases for discharge to the atmosphere. In general, the waste gases are handled in a manner consistent with required environmental procedures. The individual ventilation systems and the emission control module together constitute equipment capable of treating gases from the waste-receiving module and melter modules for discharge to the atmosphere, so that the waste treatment system does not require an external enclosure for the protection of the environment. It is to be understood that the ventilation systems are optional, and all of the gases from all of the modules could be routed through the emission control module. In such a case, the emission control module itself would constitute the equipment capable of treating gases from the waste-receiving module and melter modules for discharge to the atmosphere, and the waste treatment system still would not require an external enclosure for the protection of the environment.

The principle and mode of operation of this invention have been described in its preferred embodiment. However, it should be noted that this invention may be practiced otherwise than as specifically illustrated and described without departing from its scope.

We claim:

1. A system for the treatment of waste material comprising:

a waste-receiving module for receiving waste material and blending it with glassmaking additives, where the waste-receiving module is enclosed within a waste-receiving module container, and where the waste-receiving module container is capable of being sealed for over the road transport so that the waste-receiving module can be transported from one source of waste material to another;

a melter module containing a melter for melting the blended waste material and glassmaking additives to form molten glass, thereby stabilizing the waste material, and for discharging the molten glass to form a vitrified waste material, where the melter module is comprised of one or more melter module containers, and where the melter module containers are capable of being sealed for over the road transport so that the melter module can be transported from one source of waste material to another; and an emission control module for receiving waste gases from the melter module and for cleaning the waste gases for discharge to the atmosphere, where the emission control module is capable of being sealed for over the road transport so that it can be transported from one source of waste material to another;

wherein the system for the treatment of waste materials can be readily disassembled, transported over the road from one source of waste material to another, and reassembled.

2. The waste treatment system of claim 1 in which the waste-receiving module and melter modules are provided with a ventilation system capable of maintaining the pressure within the waste-receiving module container and melter module containers at a level below atmospheric pressure.

3. The waste treatment system of claim 2 in which the waste-receiving module and melter modules each have a separate ventilation system, and each of the ventilation systems is provided with a filtering apparatus.

4. The waste treatment system of claim 1 in which the emission control module comprises a quencher for cooling the waste gases, a cooler for further cooling the waste gases, a scrubber for removing fine particulate matter and soluble gases, a separator for removing scrub solution droplets, a blower to induce flow through the emission control module and to provide a negative pressure to the melter, and a filter for filtering particulate matter from the waste gases.

5. The waste treatment system of claim 1 in which the melter is provided with a system for removing metals.

6. The waste treatment system of claim 1 in which the waste-receiving module includes a blend tank for blending waste material with glassmaking additives, and in which the atmosphere in the blend tank is drawn off and supplied to the emission control module.

7. The waste treatment system of claim 1 where the waste-receiving module is enclosed within a waste-receiving module container, and where the melter module is enclosed within one or more melter module containers, and where the waste treatment system includes equipment capable of treating gases from the waste-receiving module and melter module for discharge to the atmosphere, so that the waste treatment system does not require an external enclosure for the protection of the environment.

8. The waste treatment system of claim 7 in which the waste-receiving and melter modules are provided with a ventilation system capable of maintaining the pressure within the waste-receiving module container and melter module containers at a level below atmospheric pressure.

9. The waste treatment system of claim 8 in which the waste-receiving module and melter modules each have a separate ventilation system, and each of the ventilation systems is provided with a filtering apparatus.

10. The waste treatment system of claim 9 in which the emission control module comprises a quencher for cooling the waste gases, a cooler for further cooling the waste gases, a scrubber for removing fine particulate matter and soluble gases, a separator for removing scrub solution droplets, a blower to induce flow through the emission control module and to provide a negative pressure to the melter, and a filter for filtering particulate matter from the waste gases.

11. A system for the treatment of waste material comprising:

a waste-receiving module for receiving waste material and blending it with glassmaking additives, where the waste-receiving module is enclosed within a waste-receiving module container, and where the waste-receiving module is provided with a ventilation system capable of maintaining the pressure within the waste-receiving module container at a level below atmospheric pressure, and where the waste-receiving module includes a blend tank for blending waste material with glassmaking additives;

a melter module containing a melter for melting the blended waste material and glassmaking additives to form molten glass, thereby stabilizing the waste material, and for discharging the molten glass to form a vitrified waste material, where the melter module is comprised of one or more melter module containers, and where the melter module is provided with a ventilation system capable of maintaining the pressure within the melter module containers at a level below atmospheric pressure; and an emission control module for receiving waste gases from the melter module and from the blend tank, the emission control module being capable of cleaning the waste gases for discharge to the atmosphere.

12. The waste treatment system of claim 11 in which the emission control module comprises a quencher for cooling the waste gases, a cooler for further cooling the waste gases, a scrubber for removing fine particulate matter and soluble gases, a separator for removing scrub solution droplets, a blower to induce flow through the emission control module and to provide a negative pressure to the melter, and a filter for filtering particulate matter from the waste gases.

13. The waste treatment system of claim 11 in which the melter is provided with a system for removing metals.

14. The waste treatment system of claim 1 in which the waste-receiving module and melter module ventilation systems are each provided with a filtering apparatus.

15. A system for the treatment of waste material comprising:

a waste-receiving module for receiving waste material and blending it with glassmaking additives, where the waste-receiving module is enclosed within a waste-receiving module container, and where the waste-receiving module container is capable of being sealed for over the road transport so that the waste-receiving module can be transported from one source of waste material to another;

a melter module containing a melter for melting the blended waste material and glassmaking additives to form molten glass, thereby stabilizing the waste material, and for discharging the molten glass to form a vitrified waste material, where the melter module is comprised of one or more melter module containers, and where the melter module containers are capable of being sealed for over the road transport so that the melter module can be transported from one source of waste material to another;

an emission control module for receiving waste gases from the melter module and for cleaning the waste gases for discharge to the atmosphere, where the emission control module is capable of being sealed for over the road transport so that it can be transported from one source of waste material to another;

a power and control module for supplying power and control to the other modules, the power and control module being positioned within a container which is capable of being transported over the road;

wherein the system for the treatment of waste materials can be readily disassembled, transported over the road from one source of waste material to another, and reassembled.

16. The waste treatment system of claim 15 in which the waste-receiving module has a ventilation system capable of maintaining the pressure within the waste-receiving module container at a level below atmospheric pressure, and the melter module has a ventilation system capable of maintaining the pressure within the melter module container at a level below atmospheric pressure, and where the waste-receiving module includes a blend tank for blending waste material with glassmaking additives, and in which the atmosphere in the blend tank is drawn off and supplied to the emission control module, and where the emission control module comprises a quencher for cooling the waste gases, a cooler for further cooling the waste gases, a scrubber for removing fine particulate matter and soluble gases, a separator for removing scrub solution droplets, a blower to induce flow through the emission control module and to provide a negative pressure to the melter, and a filter for filtering particulate matter from the waste gases.

17. A method for disposing of waste materials comprising:
receiving waste material and blending it with glassmaking additives in a waste-receiving module, where the waste-receiving module is enclosed within a waste-receiving module container, and where the waste-receiving module container is capable of being sealed for over the road transport so that the waste-receiving module can be transported from one source of waste material to another;
melting the blended waste and glassmaking additives in a melter module containing a melter to form molten glass, thereby stabilizing the waste material, and discharging the molten glass to form a vitrified waste material, where the melter module is enclosed within one or more melter module containers, and where the melter module containers are capable of being sealed for over the road transport so that the melter module can be transported from one source of waste material to another;
disassembling the waste-receiving module and the melter module from each other;
sealing the waste-receiving module container and the melter module containers for over the road transport;
transporting the waste-receiving module and the melter module containers from one source of waste material to another; and
reassembling the waste-receiving module and the melter module.

18. The method of claim 17 comprising ventilating the waste-receiving module and melter modules to maintain a pressure at a level below atmospheric pressure.

19. The method of claim 17 comprising directing waste gases from the melter module to an emission control module and cleaning the waste gases in the emission control module for discharge to the atmosphere.

20. The method of claim 19 in which the cleaning of the waste gases comprises quenching the waste gases, further cooling the waste gases, passing the waste gases through a separator for removing fine particulate matter and soluble gases from the waste gases, passing the waste gases through a separator for removing scrub solution droplets, inducing flow through the emission control module and providing a negative pressure to the melter with a blower, and passing the waste gases through a filter for filtering particulate matter from the waste gases.

21. The method of claim 17 comprising blending waste material with glassmaking additives in a blend tank in the waste-receiving module, and directing waste gases from the blend tank to the emission control module for cleaning and discharge to the atmosphere.

22. The method of claim 17 comprising removing metals from the melter.

23. A method for disposing of waste materials comprising:
receiving waste material and blending it with glassmaking additives in a blend tank positioned in a waste-receiving module, where the waste-receiving module is enclosed within a waste-receiving module container;
melting the blended waste and glassmaking additives in a melter module containing a melter to form molten glass, thereby stabilizing the waste material, and discharging the molten glass to form a vitrified waste material, where the melter module is enclosed within one or more melter module containers;
ventilating the waste-receiving module and melter modules to maintain a pressure at a level below atmospheric pressure;
directing waste gases from the blend tank and the melter to an emission control module for cleaning and discharge to the atmosphere.

24. The method of claim 23 in which the cleaning of the waste gases comprises quenching the waste gases, further cooling the waste gases, passing the waste gases through a separator for removing fine particulate matter and soluble gases from the waste gases, passing the waste gases through a separator for removing scrub solution droplets, inducing flow through the emission control module and providing a negative pressure to the melter with a blower, and passing the waste gases through a filter for filtering particulate matter from the waste gases.

* * * * *

UNITED STATES PATENT AND TRADEMARK OFFICE
Certificate

Patent No. 5,611,766                                                              Patented: March 18, 1997

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Richard C. Carle, Karl M. Slevert, Douglas H. Davis, John E. Polcyn, David Bennert, Irving M. Williams, Dennis Bickford, and John C. Whitehouse.

Signed and Sealed this Twenty-Fourth Day of November, 1998.

TAMARA L. GRAYSAY, *SPE*
                                                                                                   Art Unit 3672

UNITED STATES PATENT AND TRADEMARK OFFICE
CERTIFICATE OF CORRECTION

PATENT NO. : 5,611,766
DATED : March 18, 1997
INVENTOR(S) : Richard C. Carle, et al.

It is certified that error appears in the above-indentified patent and that said Letters Patent is hereby corrected as shown below:

column 1, line 4, insert the paragraph:

--This invention was made with Government support under Contract No. DE-AC09-96SR18500 awarded by the Department of Energy. The Government has certain rights in this invention.--

Signed and Sealed this

Twentieth Day of April, 1999

Attest:

Q. TODD DICKINSON

*Attesting Officer*    *Acting Commissioner of Patents and Trademarks*